Jan. 15, 1957 P. K. KOEHLER 2,777,717
LOCKING DEVICE FOR MACHINE ASSEMBLIES
Filed Feb. 16, 1953
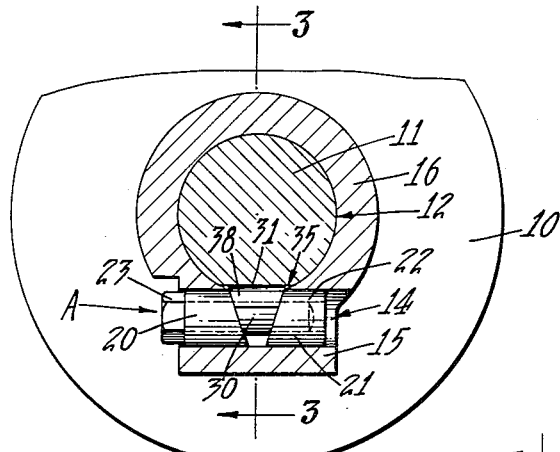
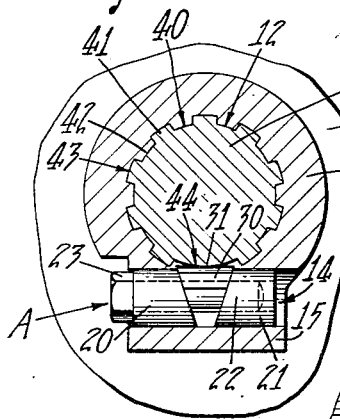
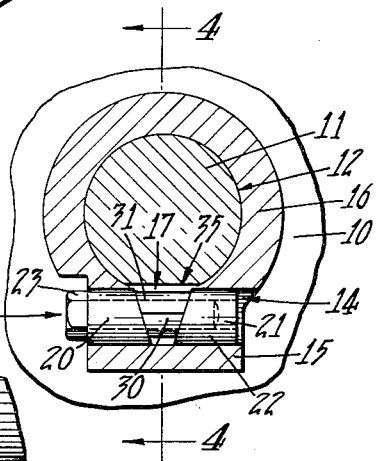
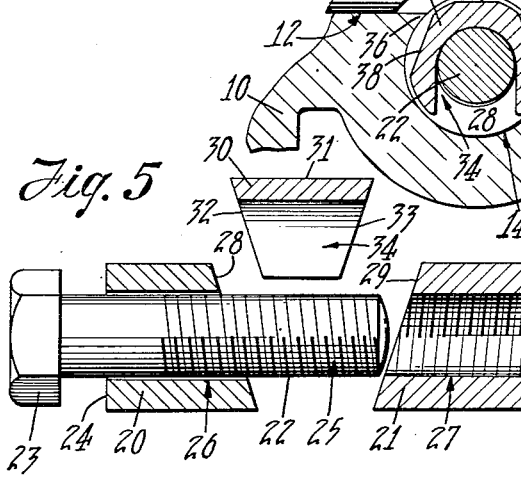
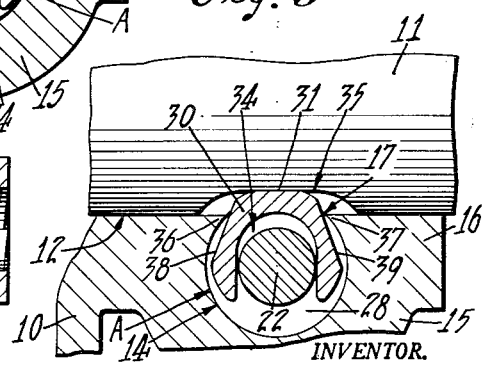
INVENTOR.
PAUL K. KOEHLER
BY Charles H. Erne
Leland R. McCann
George W. Reiber
ATTORNEYS

United States Patent Office 2,777,717
Patented Jan. 15, 1957

2,777,717

LOCKING DEVICE FOR MACHINE ASSEMBLIES

Paul K. Koehler, Union, N. J., assignor to American Can Company, New York, N. Y., a corporation of New Jersey Application February 16, 1953, Serial No. 336,934

1 Claim. (Cl. 287—52)

The present invention relates to devices for securely locking heavy machine parts onto shafts to form rigid machine assemblies and has particular reference to a simple wedging device adapted to be carried by the machine part and wherein a pair of spaced wedging members are drawn together by the simple expedient of tightening a bolt to thereby exert a powerful camming action which wedges an intermediately disposed locking member against the shaft.

There are many applications in modern machinery wherein heavy machine parts or body members such as cams, gears, wheels, or the like, must be rigidly mounted on rotating shafts. Very often, particularly in instances where they are intermittently rotated or are periodically put under heavy loads, these members have a tendency to loosen on the shaft, even when keyed to the shaft, and the resultant wear quickly renders them useless and necessitates their replacement. The instant invention contemplates providing a means for locking the body member on the shaft so securely that this tendency to loosen is either entirely overcome or substantially reduced.

An object of the present invention is the provision of such a locking device which is very inexpensive and is simple and rugged in construction, consisting of only four easily manufactured parts, three of which can be machined from a single piece of stock.

Another object is to provide a locking device which requires only that a simple cylindrical bore be drilled in the body member which is to be locked onto the shaft, the locking device being easily insertable into the bore and almost completely concealed in it.

A still further object is to provide a locking device which is entirely reliable in operation and in which a powerful wedging or camming action can be applied to a single locking tooth merely by tightening a bolt by means of a common, easily available wrench.

Numerous other objects and advantages of the invention will be apparent as it is better understood from the following description, which, taken in connection with the accompanying drawing, discloses a preferred embodiment thereof.

Referring to the drawing:

Figure 1 is a vertical cross-section taken through the hub of a machine part rigidly secured to a shaft by means of the locking device of the instant invention, the elements of the locking device being shown in tightened or locking position, parts being broken away;

Fig. 2 is a view similar to Fig. 1, but showing the locking device in position prior to tightening;

Figs. 3 and 4 are enlarged sectional views taken substantially along the lines 3—3 and 4—4 of Figs. 1 and 2, respectively, parts being shown in section and parts being broken away;

Fig. 5 is an enlarged exploded longitudinal section taken through the locking device of the instant invention; and Fig. 6 is a view similar to Fig. 1 showing the locking device as applied to a fully splined hub and shaft.

As a preferred or exemplary embodiment of the instant invention, the drawing illustrates a machine assembly comprising a heavy machine part 10 and a shaft 11. The shaft 11 is disposed in an axial bore 12 formed in the machine part 10, and the machine part and the shaft are rigidly secured together by a locking device, generally designated by the letter A, made according to the principles of this invention. The locking device A is disposed in a transverse cylindrical bore 14 formed in a boss 15 of a hub 16 which is integral with and extends from one end of the machine part 10. Although the drawing illustrates only a single locking device, it should be understood that a second locking device may be installed at the opposite end of the part 10 if the assembly is to be subjected to unusually heavy loads.

As seen in the drawings, the bore 14 extends transversely of and shallowly intersects the shaft bore 12 to a depth which is considerably less than the length of the radius of the bore 14 to thus provide a common opening 17 (see Figs. 2 and 4) between the bores.

The locking device A (see Fig. 5) includes a pair of spaced, hollow wedge members 20, 21 which are preferably but not necessarily cylindrical in outline to conform to the shape of the bore 14 and are coupled or tied together by means of a tightening bolt 22. The head 23 of the bolt abuts against an end wall 24 of the wedge member 20 while the shank 25 of the bolt passes through an oversized smooth axial bore 26 formed in the wedge member 20 and threadedly engages within a threaded axial bore 27 formed in the wedge member 21.

The wedge members 20, 21 are provided with a pair of oppositely disposed wedging faces 28, 29 which are preferably equiangularly inclined in opposite directions (see especially Fig. 5).

Interposed between the wedge members 20, 21 is a locking element or tooth 30 having a flat longitudinal locking face 31 and a pair of oppositely inclined end faces 32, 33 (see Fig. 5) which preferably are parallel to and engageable against the adjacent wedging faces 28, 29, respectively, in substantial face-to-face contact. In practice, the wedging members 20, 21 and the locking tooth 30 may be made from a single piece of stock through which two, spaced, oppositely inclined cuts are made to produce the inclined faces 28, 29 and 32, 33.

The locking tooth 30 is provided with a deep open groove or clearance opening 34 which enables it to straddle the tightening bolt 22 and permits the tooth to move transversely away from the bolt.

In use, the locking device A is inserted into the bore 14 the proper distance to bring the locking tooth 30 into alignment with the opening 17 between the bores 12, 14 (see Fig. 2). To provide the necessary clearance to permit insertion of the locking device A, a flat land or recessed face 35 is milled in the shaft 11 immediately adjacent the opening 17 to a depth at least as great as and preferably slightly greater than the depth of intersection of the bores.

The tightening bolt 22 is then turned by means of a suitable wrench and the wedge members 20, 21 are thereby drawn towards each other. This produces a powerful camming or wedging action of the inclined wedging faces 28, 29 against the inclined locking tooth faces 32, 33 which forces the locking tooth 30 radially outwardly or laterally away from the axis of the bolt 22 and through the opening 17. The flat locking face 31 of the tooth 30 is thus wedged against the flat land 35 of the shaft 11 thereby firmly securing the machine part 10 against rotation on the shaft 11 and producing a rigid unitary assembly.

As seen best in Figs. 3 and 4, the shallowness of the intersection between the bores 12 and 14 result in a pair of shoulders 36, 37 which are formed in the hub 16 parallel to the transverse bore 14 and which overhang the locking tooth 30. In order to permit free outward movement of the tooth through the opening 17 without interference from these shoulders 36, 37 the tooth preferably is made slightly smaller in diameter than the wedge members 20, 21 and is ground off or tapered at 38, 39 adjacent its flat face 31 to reduce the thickness of that part of it which is disposed adjacent the shoulders 36, 37.

In the machine assembly illustrated in Fig. 6, the locking device A is used to augment the holding power of a fully splined bore 12 and shaft 11. In this embodiment, a series of equally spaced splineways 40 and keys 41 are milled in the shaft 11 and mesh with a corresponding series of keys 42 and splineways 43 formed in the bore 12 of the machine part 10 to hold the part on the shaft. As seen in the drawing, the flat land 35 which would normally align with the locking tooth 30 is eliminated, and the flat face 31 of the tooth engages against the resultant enlarged recessed face of the curved groove 44 and forces the cooperating keys and splineways into intimate engagement.

Although the locking face 31 and the curved groove 44 meet only in line contact, it has been found in actual practice that the use of the locking device A permits the adoption of much less rigid manufacturing tolerances for the keys and splineways while still maintaining an operating life span of the assembly which compares favorably with the life span of an assembly wherein the locking device A is not used but in which the machining tolerances are very much smaller. This results in manufacturing economies which greatly offset the extra cost of the locking device.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

In a machine assembly, the combination of a machine part, a cylindrical axial bore formed in said part, a cylindrical transverse bore formed in said machine part and intersecting said axial bore to provide a common opening between said bores, the cylindrical wall of said transverse bore adjacent each side of said common opening forming a pair of spaced overhanging shoulders extending from said opening to the lines of intersection between said wall and a plane passing through the axis of said transverse bore and extending parallel to the axis of said axial bore, a shaft disposed in said axial bore for carrying said machine part, said shaft being provided adjacent said common opening with a flat face recessed to a depth at least as great as the depth of intersection between said bores so that said transverse bore is completely unobstructed by said shaft, and a locking device positioned in said unobstructed transverse bore, said locking device comprising a pair of longitudinally spaced wedge members each having a wedging face, said faces being opposed to each other and diverging toward said shaft, a tightening bolt disposed in axial alignment with and coupling said wedge members for drawing said wedge members toward each other, and a locking tooth interposed between said wedge members, said locking tooth having a wedging face on each end thereof parallel to and engaging a said wedge member face adjacent thereto and having a flat locking face extending chordally of said transverse bore and disposed in alignment with said common opening and in opposition to and in parallelism with said flat recessed shaft face and spaced from said face, each portion of said locking tooth beneath said overhanging shoulders being spaced from said shoulders a distance when measured in a plane extending at right angles to said first named plane at least as great as the spacing between said flat locking faces, whereby when said wedge members are drawn together by said tightening bolt said locking tooth is cammed laterally of said transverse bore through said common opening without interference from said overhanging shoulders to bring its said flat locking face into pressured engagement against said flat recessed shaft face to force said machine part into tight frictional engagement with said shaft and to key said machine part against rotation relative to said shaft.

References Cited in the file of this patent

UNITED STATES PATENTS

| | | |
|---|---|---|
| 974,156 | Jones | Nov. 1, 1910 |
| 1,382,175 | De La Monte | June 21, 1921 |
| 1,586,990 | Harrison | June 1, 1926 |
| 1,830,976 | Ashworth | Nov. 10, 1931 |
| 1,907,506 | Coburn | May 9, 1933 |

FOREIGN PATENTS

| | | |
|---|---|---|
| 15,200 | Great Britain | Aug. 14, 1929 |